(12) United States Patent
Seto (10) Patent No.: US 12,348,688 B2
(45) Date of Patent: Jul. 1, 2025

(54) IMAGE FORMING APPARATUS

(71) Applicant: KYOCERA Document Solutions Inc., Osaka (JP)

(72) Inventor: Akifumi Seto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 99 days.

(21) Appl. No.: 18/555,371

(22) PCT Filed: Mar. 14, 2022

(86) PCT No.: PCT/JP2022/011212
§ 371 (c)(1),
(2) Date: Oct. 13, 2023

(87) PCT Pub. No.: WO2022/224626
PCT Pub. Date: Oct. 27, 2022

(65) Prior Publication Data
US 2024/0195923 A1    Jun. 13, 2024

(30) Foreign Application Priority Data
Apr. 22, 2021 (JP) ................... 2021-072540

(51) Int. Cl.
*H04N 1/04* (2006.01)
*H04N 1/00* (2006.01)
*H04N 1/21* (2006.01)

(52) U.S. Cl.
CPC ....... *H04N 1/00413* (2013.01); *H04N 1/2166* (2013.01); *H04N 2201/0094* (2013.01)

(58) Field of Classification Search
USPC .................... 358/1.16, 401, 400
See application file for complete search history.

(56) References Cited

U.S. PATENT DOCUMENTS

| 7,913,189 B2 | 3/2011 | Baba |
| 2006/0187483 A1 | 8/2006 | Baba |

(Continued)

FOREIGN PATENT DOCUMENTS

| JP | 2006-260544 A | 9/2006 |
| JP | 2015-037314 A | 2/2015 |

(Continued)

*Primary Examiner* — Cheukfan Lee
(74) *Attorney, Agent, or Firm* — Studebaker Brackett PLLC (57) ABSTRACT

An image forming apparatus (10) includes storage (18), reception section (11), display section (11), image forming section (14), and display controller (16A). Storage (18) stores files for each of, pieces of personal information. Each of the files is associated with one piece of personal information among the pieces of personal information. Reception section (11) receives a piece of personal information among the pieces of personal information. Display section (11) displays first list. First list includes file names respectively indicating the files. Each of the files is associated with corresponding personal information which reception section (11) has received. Image forming section (14) forms image based on first list. Display controller (16A) controls display section (11) so that it adds visually-identifiable information to file name, in which the image has not yet been formed with image forming section (14), among the file names in the first list.

9 Claims, 8 Drawing Sheets (56) References Cited

U.S. PATENT DOCUMENTS

2018/0027031 A1* 1/2018 Kodaira ................ H04N 7/152
                                                    715/753
2020/0019351 A1   1/2020 Kondoh

FOREIGN PATENT DOCUMENTS

JP          2018-149736 A      9/2018
JP          2020-006634 A      1/2020

* cited by examiner

FIG. 2

| Personal Information | File name | Date-and-time information | Terminal information | Print information |
|---|---|---|---|---|
| PB | B-100 | 2020-10-03 15:40 | PC | |
| PB | B-101 | 2020-10-14 15/40 | MFP | |
| PA | A-100 | 2020-10-15 15:40 | PC | |
| PB | B-102 | 2020-10-28 15:40 | FAX | |
| PB | B-103 | 2020-10-30 15:40 | PC | Completed |

FIG. 3

| Personal Information | File name | Date-and-time information | Terminal information | Print information |
|---|---|---|---|---|
| PB | B-200 | 2020-10-02 15:40 | PC | Completed |
| PA | A-200 | 2020-10-13 15/40 | PC | |
| PB | B-201 | 2020-10-15 15:40 | MFP | |
| PB | B-202 | 2020-10-25 15:40 | FAX | |
| PB | B-203 | 2020-10-30 15:40 | PC | |

| 1 | | 3 | | 2 | |
|---|---|---|---|---|---|
| | File name | Date-and-time information | Terminal information | Print information | Storage destination information |
| ✓ | B-100 | 2020-10-03 15:40 | PC | | First storage area |
| ✓ | B-101 | 2020-10-14 15/40 | MFP | | First storage area |
| ✓ | B-201 | 2020-10-15 15:40 | MFP | | Second storage area |
| ✓ | B-202 | 2020-10-25 15:40 | FAX | | Second storage area |
| ✓ | B-102 | 2020-10-28 15:40 | FAX | | First storage area |
| ✓ | B-203 | 2020-10-30 15:40 | PC | | Second storage area |
| | B-200 | 2020-10-02 15:40 | PC | Completed | Second storage area |
| | B-103 | 2020-10-30 15:40 | PC | Completed | First storage area |

FIG. 6

| 1 | | 3 | | 2 | |
|---|---|---|---|---|---|
| | File name | Date-and-time information | Terminal information | Print information | Storage destination information |
| | B-100 | 2020-10-03 15:40 | PC | | First storage area |
| ✓ | B-101 | 2020-10-14 15/40 | MFP | | First storage area |
| ✓ | B-201 | 2020-10-15 15:40 | MFP | | Second storage area |
| ✓ | B-202 | 2020-10-25 15:40 | FAX | | Second storage area |
| ✓ | B-102 | 2020-10-28 15:40 | FAX | | First storage area |
| ✓ | B-203 | 2020-10-30 15:40 | PC | | Second storage area |
| | B-200 | 2020-10-02 15:40 | PC | Completed | Second storage area |
| ✓ | B-103 | 2020-10-30 15:40 | PC | Completed | First storage area |

FIG. 7

| | File name | Date-and-time information | Terminal information | Print information | Storage destination information |
|---|---|---|---|---|---|
| | B-200 | 2020-10-02 15:40 | PC | Completed | Second storage area |
| | B-100 | 2020-10-03 15/40 | PC | | First storage area |
| | B-101 | 2020-10-14 15:40 | MFP | | First storage area |
| | B-201 | 2020-10-15 15:40 | MFP | | Second storage area |
| | B-202 | 2020-10-25 15:40 | FAX | | Second storage area |
| | B-102 | 2020-10-28 15:40 | FAX | | First storage area |
| | B-103 | 2020-10-30 15:40 | PC | Completed | First storage area |
| | B-203 | 2020-10-30 15:40 | PC | | Second storage area |

FIG. 8

| | File name | Date-and-time information | Terminal information | Print information | Storage destination information |
|---|---|---|---|---|---|
| ✓ | B-200 | 2020-10-02 15:40 | PC | Completed | Second storage area |
| | B-100 | 2020-10-03 15/40 | PC | | First storage area |
| ✓ | B-101 | 2020-10-14 15:40 | MFP | | First storage area |
| | B-201 | 2020-10-15 15:40 | MFP | | Second storage area |
| ✓ | B-202 | 2020-10-25 15:40 | FAX | | Second storage area |
| | B-102 | 2020-10-28 15:40 | FAX | | First storage area |
| | B-103 | 2020-10-30 15:40 | PC | Completed | First storage area |
| | B-203 | 2020-10-30 15:40 | PC | | Second storage area |

| 1 | | 4 | 2 | 3 |
|---|---|---|---|---|
| | File name | Date-and-time information | Terminal information | Print information | Storage destination information |
| ✓ | B-100 | 2020-10-03 15:40 | PC | | First storage area |
| ✓ | B-101 | 2020-10-14 15/40 | MFP | | First storage area |
| ✓ | B-102 | 2020-10-28 15:40 | FAX | | First storage area |
| | B-201 | 2020-10-15 15:40 | MFP | | Second storage area |
| | B-202 | 2020-10-25 15:40 | FAX | | Second storage area |
| | B-203 | 2020-10-30 15:40 | PC | | Second storage area |
| | B-103 | 2020-10-30 15:40 | PC | Completed | First storage area |
| | B-200 | 2020-10-02 15:40 | PC | Completed | Second storage area |

FIG. 11

| 1 | | 4 | 3 | 2 | |
|---|---|---|---|---|---|
| | File name | Date-and-time information | Terminal information | Print information | Storage destination information |
| ✓ | B-100 | 2020-10-03 15:40 | PC | | First storage area |
| ✓ | B-203 | 2020-10-30 15/40 | PC | | Second storage area |
| | B-202 | 2020-10-25 15:40 | FAX | | Second storage area |
| | B-102 | 2020-10-28 15:40 | FAX | | First storage area |
| | B-101 | 2020-10-14 15:40 | MFP | | First storage area |
| | B-201 | 2020-10-15 15:40 | MFP | | Second storage area |
| | B-200 | 2020-10-02 15:40 | PC | Completed | Second storage area |
| | B-103 | 2020-10-30 15:40 | PC | Completed | First storage area |

FIG. 12

IMAGE FORMING APPARATUS

TECHNICAL FIELD

The present invention relates to an image forming apparatus.

BACKGROUND ART

There are multi-function printers that provide functions such as photocopier function, printer function, fax transmission/reception function, and printing function with data stored temporarily and internally. (See Patent Literature 1, for example). Users touching menus displayed on a liquid crystal monitor equipped with a touch panel enables operation of such multi-function printers. The liquid crystal monitor may display file names stored in a storage device of the liquid crystal monitor and allows a user to print copies of the matter to be printed, corresponding to the file name selected by the user.

CITATION LIST

Patent Literature

Patent Literature 1: JP 2006-260544 A

SUMMARY OF INVENTION

Technical Problem

It however takes time to select a desired file from a plurality of files in the multi-function printer described in Patent Literature 1.

The present invention has been achieved in view of the above circumstances, and an object thereof is to provide an image forming apparatus capable of easily forming an image based on a desired file.

Solution to Problem

An image forming apparatus according to an aspect of the present invention includes storage, a reception section, a display section, an image forming section, and a display controller. The storage stores a plurality of files for each of, pieces of personal information. Each of the plurality of files is associated with one piece of personal information among the pieces of personal information. The reception section receives a piece of personal information among the pieces of personal information. The display section displays a first list. The first list includes a plurality of file names that respectively indicates the plurality of files. Each of the plurality of files is associated with corresponding personal information which the reception section has received. The image forming section forms an image based on the first list. The display controller controls the display section so that the display section adds visually-identifiable information to each file name, in which the image has not yet been formed with the image forming section, among the plurality of file names in the first list

Advantageous Effects of Invention

The image forming apparatus of the present invention makes it possible to easily form an image based on a desired file.

DESCRIPTION OF EMBODIMENTS

Hereinafter, embodiments of the present invention will be described with reference to the drawings. Elements which are the same or equivalent are labeled with the same reference signs in the drawings and description thereof is not repeated.

First Embodiment

Figure 1:
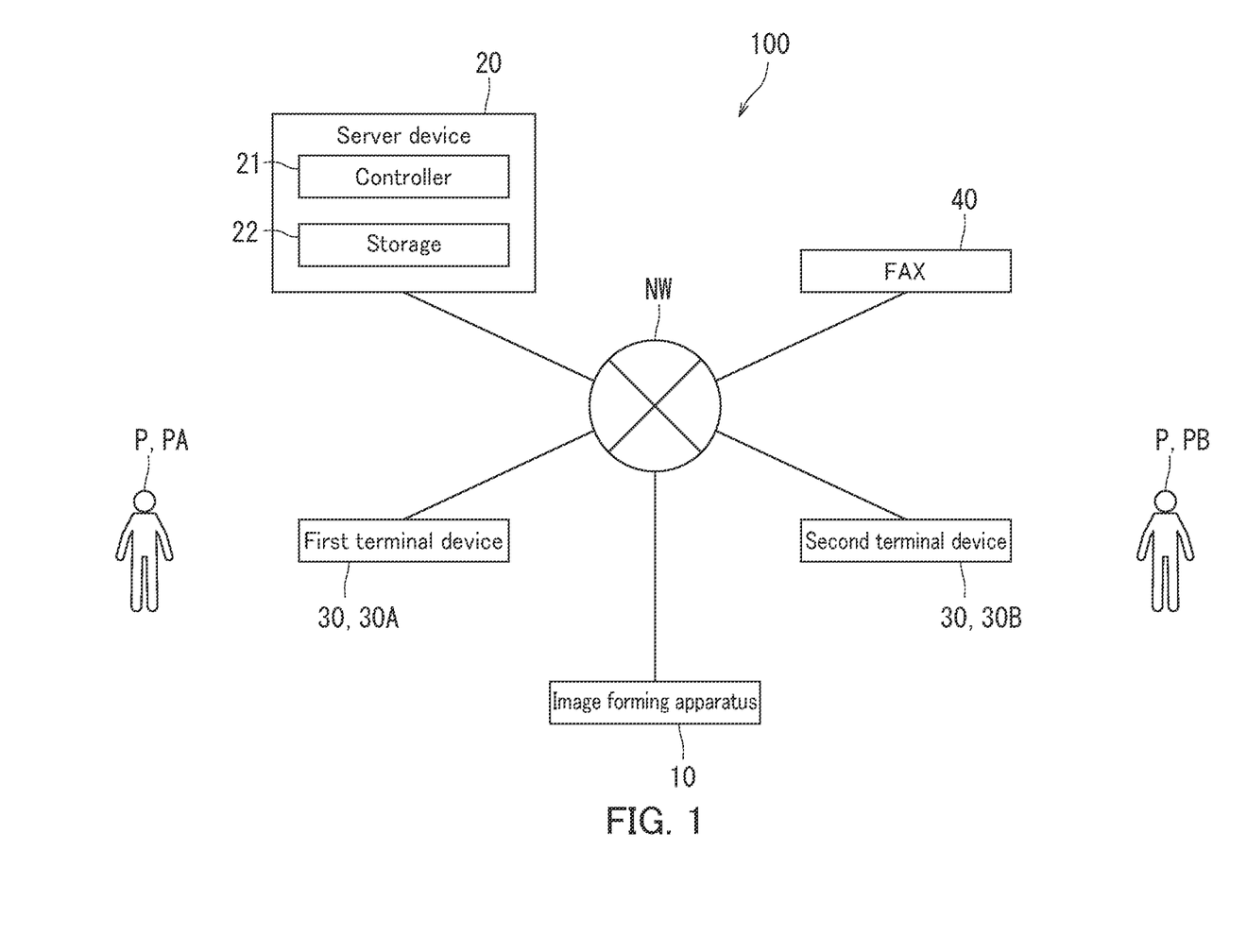
FIG. 1 is a diagram illustrating the configuration of an image forming system in a first embodiment of the present invention.

A configuration of an image forming system 100 in a first embodiment of the present invention will be described with reference to FIG. 1. FIG. 1 is a diagram illustrating the configuration of the image forming system 100. The image forming system 100 includes an image forming apparatus 10, a server device 20, a plurality of terminal devices 30, and a FAX (facsimile machine) 40. The image forming apparatus 10, the server device 20, the plurality of terminal devices 30, and the FAX 40 communicate with each other via the network NW. Examples of the network NW include the Internet, a wide area network (WAN), a local area network (LAN), and the public switched telephone network. The image forming apparatus 10 is used by a plurality of users P. The plurality of users P includes a first user PA and a second user PB.

The image forming apparatus 10 acquires a file and forms an image on a sheet of paper based on the file. The file has a data format that allows the image forming apparatus 10 to process. In the first embodiment, a "file" means data created in a page description language (PDL). The page description language is a language used to describe an output image to the image forming apparatus 10 to instruct the image forming apparatus 10 when printing a document and/or an image created on a computer.

The server device 20 includes a controller 21 and storage 22. Examples of the controller 21 include a central processing unit (CPU). Examples of the storage 22 include semiconductor memory. The storage 22 may further include a hard disk drive (HDD).

Examples of each terminal device 30 include a personal computer, a tablet terminal, and a smart phone. The plurality of terminal devices 30 includes a first terminal device 30A and a second terminal device 30B. The first terminal device 30A is used by the first user PA. The second terminal device 30B is used by the second user PB.

Each of the plurality of terminal devices 30 transmits files to the image forming device 10 via the network NW. The files are indicated by their respective file names.

Specifically, the first terminal device 30A transmits a first file to the image forming apparatus 10 in response to receiving an operation by the first user PA. The first file is indicated by, for example a file name "A-100" named by the first user PA. More specifically, the first terminal device 30A requests the image forming apparatus 10 to store the first file that is associated with personal information specifying the first user PA. The image forming apparatus 10 then stores the first file that is associated with terminal information indicating the first terminal device 30A.

On the other hand, the second terminal device 30B transmits a second file to the image forming apparatus 10 in response to receiving an operation by the second user PA. The second file is indicated by, for example a file name "B-100" named by the second user PB. More specifically, the second terminal device 30B requests the image forming apparatus 10 to store the second file that is associated with personal information specifying the second user PB. The image forming apparatus 10 then stores the second file that is associated with terminal information indicating the second terminal device 30B.

The FAX 40 transmits a third file to the image forming apparatus 10 via the network NW. The third file is indicated by, for example a file name "B-102" named by the second user PB. The FAX 40 is used by the second user PB. Specifically, the FAX 40 transmits the third file to the image forming apparatus 10 in response to receiving an operation by the second user PB. More specifically, the FAX 40 requests the image forming apparatus 10 to store the third file that is associated with personal information specifying the second user PB. The image forming apparatus 10 then stores the third file that is associated with terminal information indicating the TAX 40.

Figure 2:
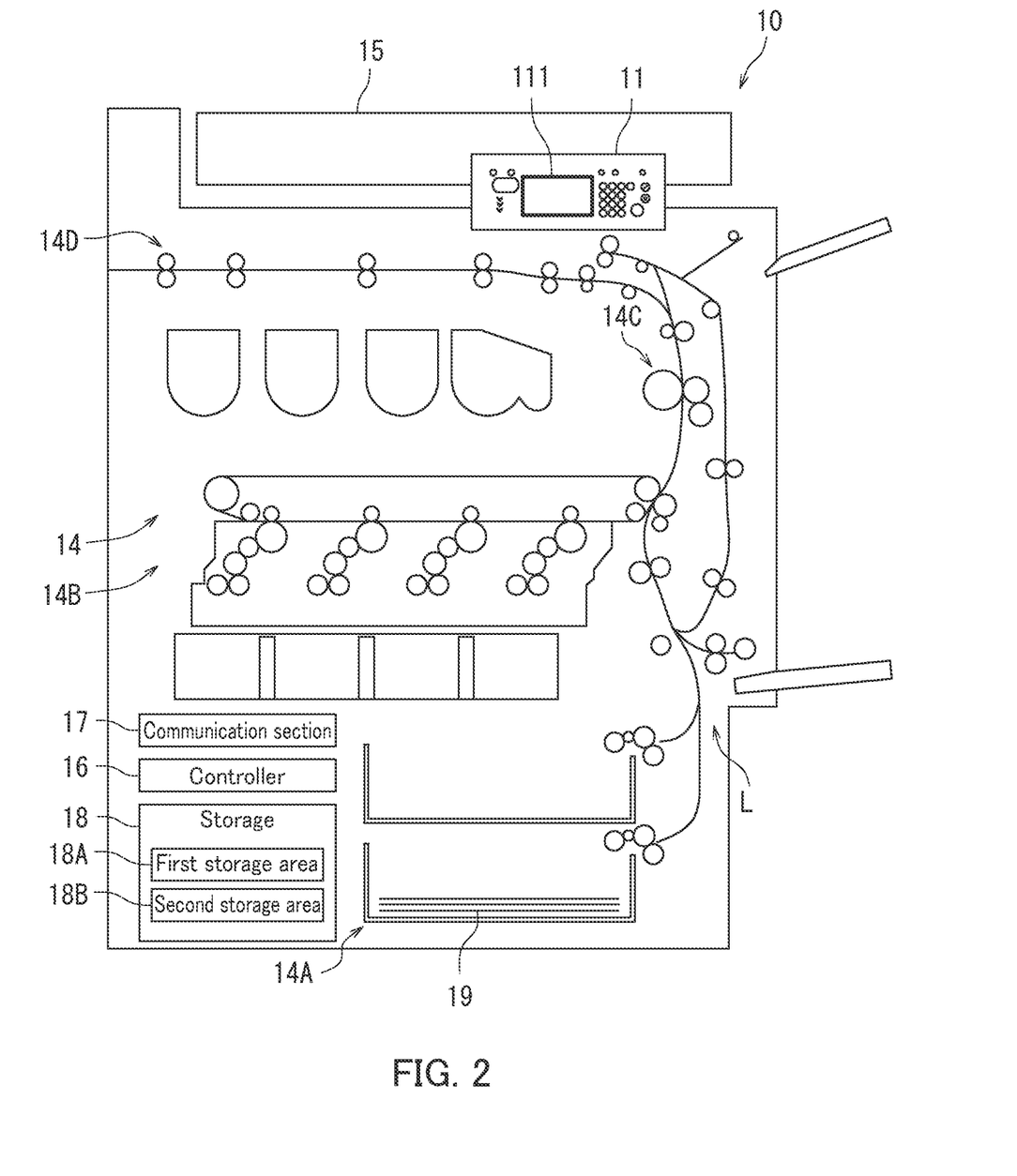
FIG. 2 is a diagram illustrating the configuration of an image forming apparatus according to the first embodiment.

The image forming apparatus 10 according to the first embodiment will be further described with reference to FIG. 2. FIG. 2 is a diagram illustrating the configuration of the image forming apparatus 10. The image forming apparatus 10 is a color photocopier as illustrated in FIG. 2.

The image forming apparatus 10 forms an image on a sheet of paper 19. Specifically, the image forming apparatus 10 includes an operation display section 11, an image forming section 14, a reading section 15, a communication section 17, a controller 16, and storage 18. The operation display section 11 exemplifies a "reception section" and a "display section". The communication section 17 exemplifies a "receiving section".

The image forming section 14 includes a paper feed section 14A, a conveyance section L, a forming section 14B, a fixing section 14C, and an ejecting section 14D. The paper feed section 14A supplies a sheet of paper 19 to the conveyance section L. The conveyance section L conveys the sheet of paper 19 to the ejecting section 14D via the forming section 14B and the fixing section 14C.

The forming section 14B forms an image on the sheet of paper 19 by electrophotography. The fixing section 14C heats and presses the sheet of paper 19 so that the image formed on the sheet of paper 19 is fixed to the sheet of paper 19. The ejecting section 14D ejects the sheet of paper 19 outside the image forming apparatus 10.

The reading section 15 reads an image to create a file. Specifically, the reading section 15 receives respective operations by the plurality of users P to read their respective files. More specifically, the reading section 15 receives an operation by the first user PA to read a fourth file. The image forming apparatus 10 stores the fourth file that is associated with personal information specifying the first user PA. The reading section 15 also receives an operation by the second user PB to read a fifth file. The fifth file is indicated by, for example a file name "B-101" named by the second user PB. The image forming apparatus 10 stores the fifth file that is associated with personal information specifying the second user PB. The image forming apparatus 10 then stores the fifth file that is associated with information created by the reading section 15.

The operation display section 11 receives respective operations by the plurality of users P, while displaying different pieces of information. The operation display section 11 includes a display section 111. The display section 111 includes, for example, a liquid crystal display (LCD) and a touch sensor.

The communication section 17 receives files from the first terminal device 30A, the second terminal device 30B, and the FAX 40. The communication section 17 is, for example a network interface controller (NIC) that performs communication according to a predetermined communication protocol. Alternatively, the communication section 17 performs communication conforming to Wi-Fi communication standards. Examples of the predetermined communication protocol include the Internet protocol suite known as transmission control protocol/internet protocol (TCP/IP).

The controller 16 controls operations of the image forming apparatus 10. The controller 16 includes, for example a CPU.

The storage 18 stores a plurality of files for each of, pieces of personal information. Each of the plurality of files is associated with one piece of personal information among the pieces of personal information. Specifically, the storage 18 includes a semiconductor memory. The storage 18 may further include an HDD. The storage 18 includes a plurality of storage areas. Specifically, the storage 18 includes a first storage area 18A and a second storage area 18B.

Figure 3:
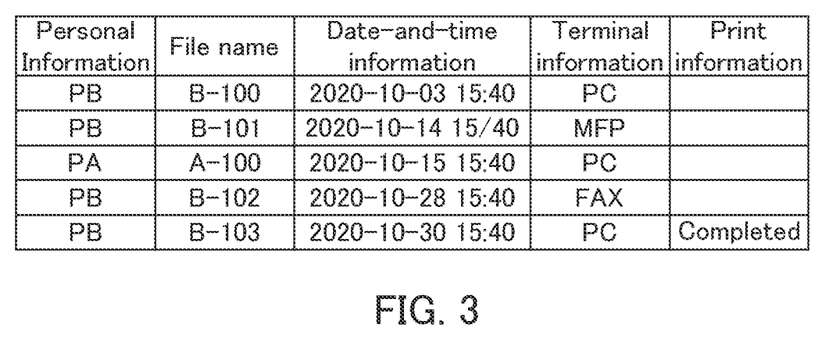
FIG. 3 illustrates a plurality of files stored in a first storage area in the first embodiment.
Figure 4:
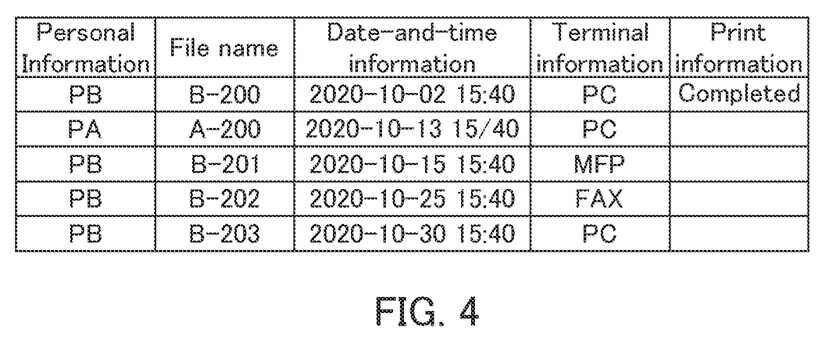
FIG. 4 illustrates a plurality of files stored in a second storage area in the first embodiment.

The storage 18 in the first embodiment will be further described with reference to FIGS. 3 and 4. FIG. 3 is a diagram illustrating a plurality of files stored in the first storage area 18A. FIG. 4 is a diagram illustrating a plurality of files stored in the second storage area 18B. As illustrated in FIGS. 3 and 4, in each of the first storage area 18A and the second storage area 18B, a plurality of files is stored therein. For example, a plurality of files is stored in any of the first storage area 18A and the second storage area 18B in response to receiving respective operations by the plurality of users P.

Each of the plurality of files includes personal information, file name, date-and-time information, terminal information, and print information. The personal information specifies a particular user, among the plurality of users P, who has requested the image forming apparatus to store the file. Specifically, the personal information specifies either the first user PA or the second user PB.

Each file name indicates a corresponding file. The plurality of file names is different from each other. Specifically, the plurality of file names include "B-100", "B-101", "A-100", "B-102", and "B-103", as well as "B-200", "A-200", "B-201", "B-202", and "B-203".

The date-and-time information indicates the date and time when the corresponding file has been stored. Specifically, when the storage 18 stores a file at 15:40 on Oct. 3, 2020, the date-and-time information indicates "15:40 on Oct. 3, 2020". When the storage 18 stores a file at 15:40 on Oct. 14, 2020, the date-and-time information indicates "15:40 on Oct. 14, 2020".

The terminal information indicates any one of the first terminal device 30A, the second terminal device 30B, and the FAX 40. Specifically, the terminal information indicates "MFP" when the corresponding file is read through the reading section 15. The terminal information also indicates "FAX" when the corresponding file is received from the FAX 40. The terminal information also indicates "PC" when the corresponding file is received from the terminal device 30.

The print information is information indicating whether or not a corresponding image has been formed with the image forming section 14. Specifically, the print information indicates "Completed" after the corresponding image has been formed with the image forming section 14. The print information indicates "Blank" when the corresponding image has not yet been formed with the image forming section 14.

Figure 5:
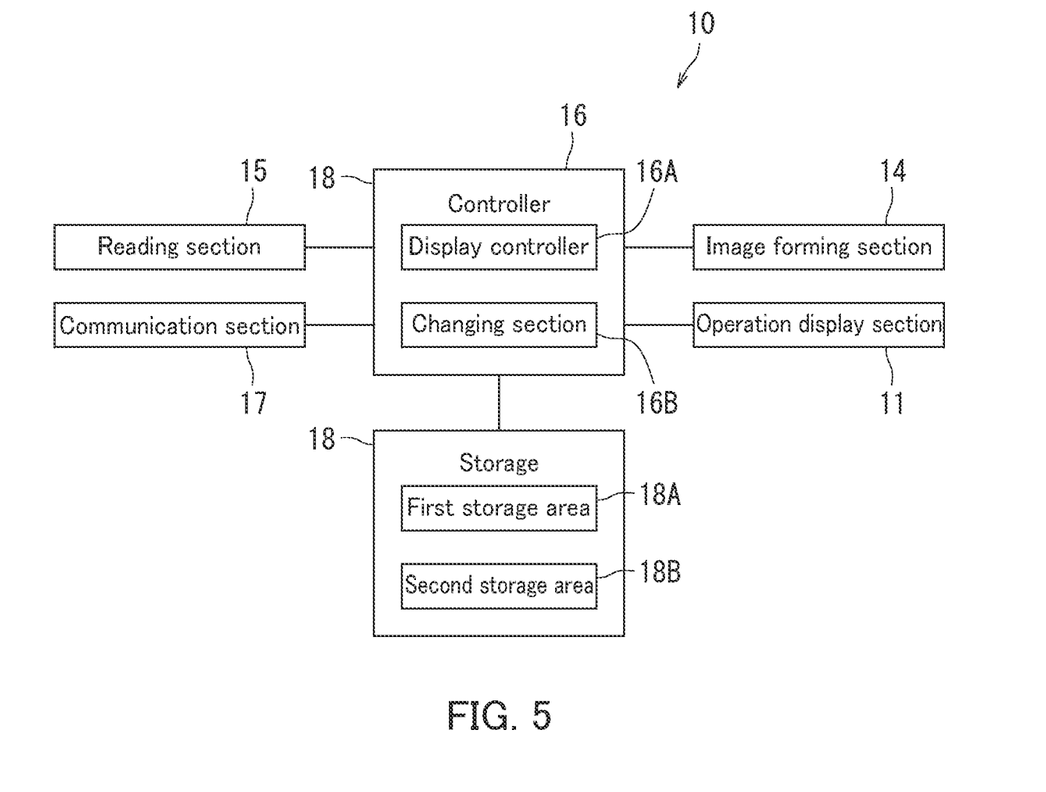
FIG. 5 is a diagram illustrating the functions of a controller in the image forming apparatus according to the first embodiment.

Functions of the image forming apparatus 10 according to the first embodiment will be further described with reference to FIG. 5. FIG. 5 is a diagram illustrating functions of the controller 16 in the image forming apparatus 10. As illustrated in FIG. 5, the controller 16 reads a control program from the storage 18 and then executes the control program.

Specifically, the controller 16 includes a display controller 16A.

The operation display section 11 receives one piece of personal information among the pieces of personal information. Specifically, the operation display section 11 acquires personal information specifying the first user PA in response to receiving an operation by the first user PA. On the other hand, the operation display section 11 acquires personal information specifying the second user PB in response to receiving an operation by the second user PB.

Figure 6:
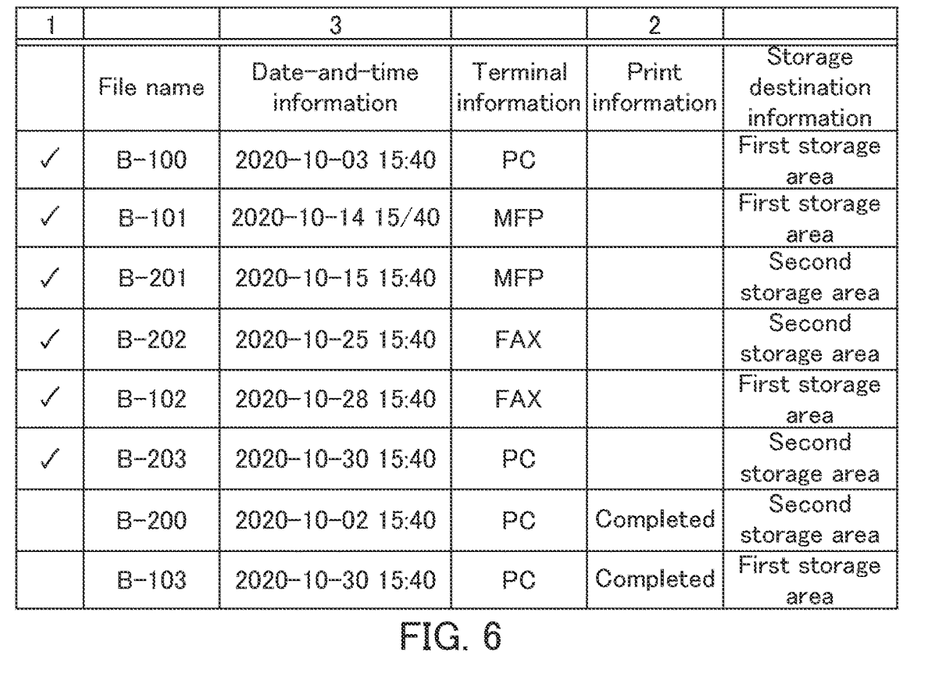
FIG. 6 is a diagram illustrating a first list which the image forming apparatus displays on a display section in the first embodiment.

The operation display section 11 in the first embodiment will be further described with reference to FIG. 6. FIG. 6 is a diagram illustrating a first list which the image forming apparatus 10 displays on the display section 111. As illustrated in FIG. 6, the operation display section 11 displays the first list.

The first list includes a plurality of file names. The plurality of file names respectively indicates the plurality of files. Each of the plurality of files is associated with corresponding personal information which the operation display section 11 has received. Specifically, the first list includes a plurality of file names respectively indicating a plurality of files, each of which is associated with the second user PB as the corresponding personal information which the operation display section 11 has received. More specifically, the first list includes file name "B-100", file name "B-101", file name "B-201", file name "B-202", file name "B-102", file name "B-203", file name "B-200", and file name "B-103".

Specifically, the first list includes visually-identifiable information, file names, date-and-time information, terminal information, print information, and storage destination information. The storage destination information indicates either the first storage area 18A or the second storage area 18B.

The display controller 16A controls the display section 111 so that visually-identifiable information is added to each file name, among the file names, which satisfies a predetermined condition. The predetermined condition indicates that the image forming section 14 has not yet formed a corresponding image. In other words, the display controller 16A controls the display section 111 so that visually-identifiable information is added to each file name, in which the image forming section 14 has not yet formed the corresponding image, among the plurality of file names. The visually-identifiable information is, for example a check mark.

For example, when no image is formed in "B-100", "B-101", "B-201", "B-202", "B-102", and "B-203", the check mark is added to each of "B-100", "B-101", "B-201", "B-202", "B-102", and "B-203". On the other hand, when a corresponding image is formed in each of "B-200" and "B-103", the check mark is added to neither of "B-200" and "B-103".

As described above with reference to FIG. 6, the display controller 16A controls the display section 111 so that the visually-identifiable information is added to each file name that satisfies the predetermined condition. This enables each user to recognize file names that satisfy the predetermined condition. Therefore, each user can easily form an image based on a desired file.

More specifically, the display controller 16A controls the image forming section 14 so that an image is formed based on a file indicated by a file name to which the visually-identifiable information is added. Specifically, the display controller 16A controls the image forming section 14 so that an image is formed in each of "B-100", "B-101", "B-201", "B-202", "B-102", and "B-203". As a result, each user can more easily form an image based on a desired file.

Figure 7:
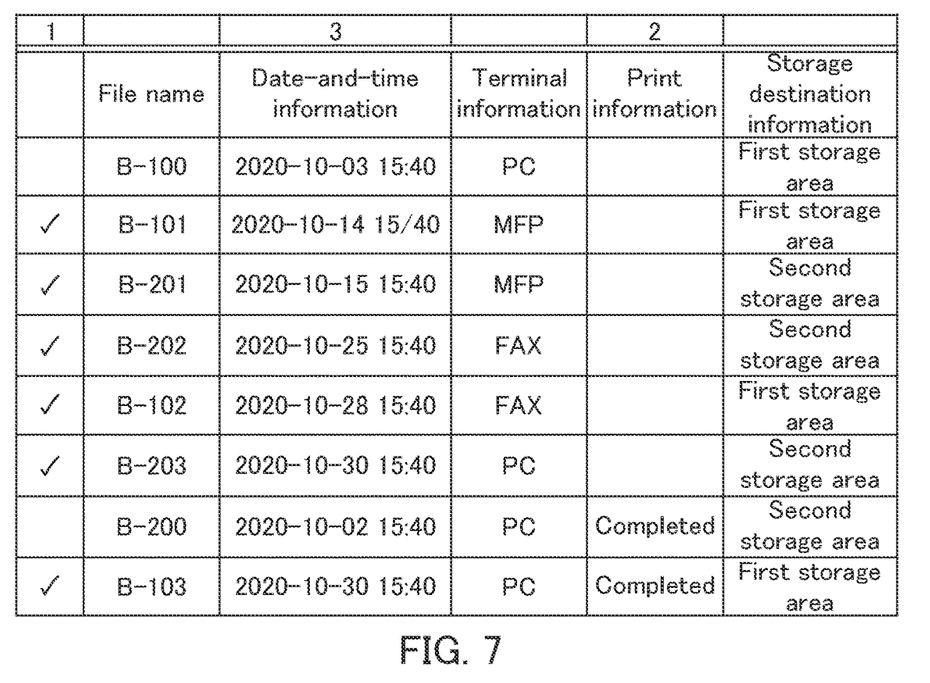
FIG. 7 is a diagram illustrating the first list which the image forming apparatus displays on the display section in the first embodiment.

The operation display section 11 in the first embodiment will be further described with reference to FIG. 7. FIG. 7 is a diagram illustrating a first list which the image forming apparatus 10 displays on the display section 111. As illustrated in FIG. 7, the operation display section 11 displays a first list.

As illustrated in FIG. 5, the controller 16 further includes a changing section 16B. The changing section 16B adds or deletes the visually-identifiable information to or from a file name included in the first list. Specifically, the changing section 16B deletes the check mark added to "B-100" in response to receiving an operation by the second user PB. The changing section 16B also adds the check mark to "B-103" in response to receiving an operation by the second user PB.

In the example of FIG. 7, the check mark is added to each of "B-101", "B-201", "B-202", "B-102", "B-203", and "B-103". On the other hand, the check mark is added to neither of "B-100" and "B-200".

The display controller 16A controls the image forming section 14 so that an image is formed based on a file indicated by a file name to which the visually-identifiable information is added. Specifically, the display controller 16A controls the image forming section 14 so that an image is formed in each of "B-101", "B-201", "B-202", "B-102", "B-203", and "B-103". As a result, each user can easily form an image based on a desired file.

The operation display section 11 receives one of a first display method and a second display method. The operation display section 11 displays the first list in response to receiving the first display method. On the other hand, the operation display section 11 displays the second list in response to receiving the second display method. The second list includes a plurality of file names which are arranged in the order of date and time.

Figure 8:
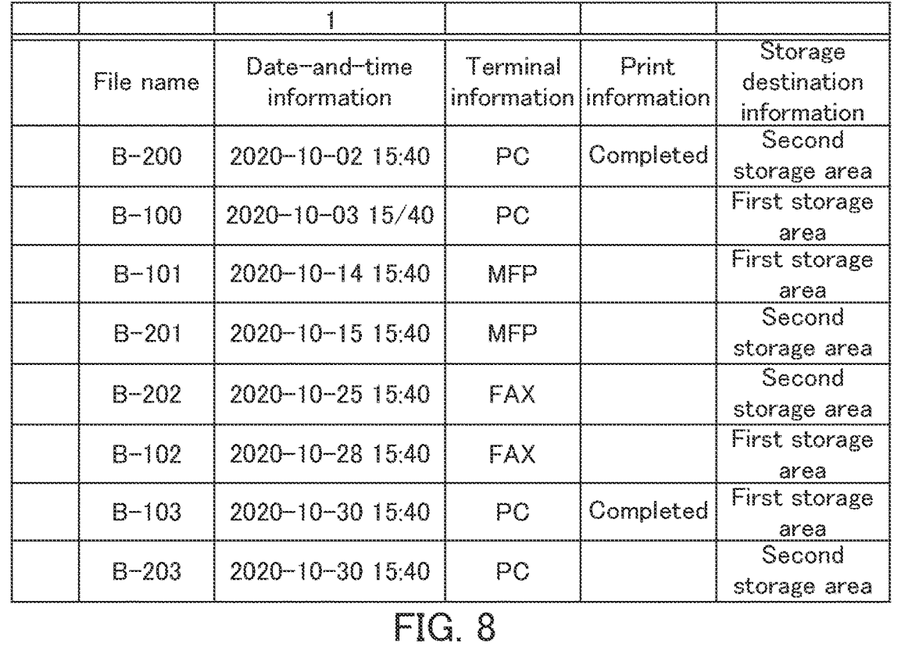
FIG. 8 is a diagram illustrating a second list which the image forming apparatus displays on the display section in the first embodiment.

The operation display section 11 in the first embodiment will be further described with reference to FIG. 8. FIG. 8 is a diagram illustrating the second list which the image forming apparatus 10 displays on the display section 111. As illustrated in FIG. 8, the display section 111 displays the second list.

The second list includes file names indicating their respective files. Each of these files is associated with corresponding personal information received through the operation display section 11. Specifically, the second list includes file names indicating their respective files each of which is associated with the second user PB received through the operation display section 11. More specifically, the second list includes file name "B-200", file name "B-100", file name "B-101", file name "B-201", file name "B-202", file name "B-102", file name "B-103", and file name "B-203".

The second list includes file names, date-and-time information, terminal information, print information, and storage destination information. The second user PB can recognize the file names indicating their respective files each of which is associated with the second user PB.

Figure 9:
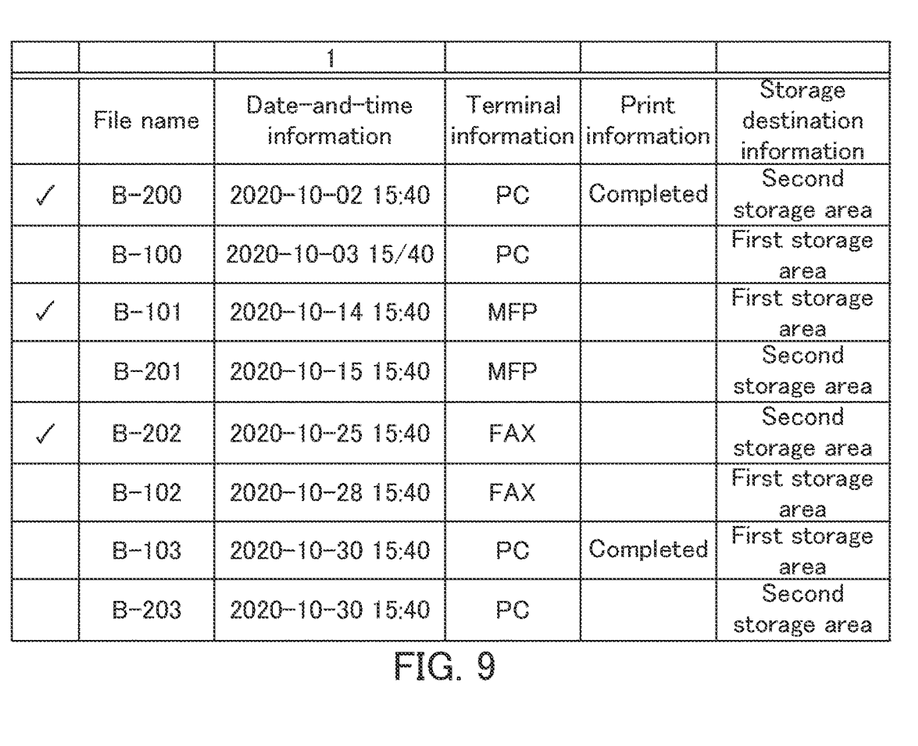
FIG. 9 is a diagram illustrating the second list which the image forming apparatus displays on the display section in the first embodiment.

The operation display section 11 in the first embodiment will be further described with reference to FIG. 9. FIG. 9 is a diagram illustrating the second list which the image forming apparatus 10 displays on the display section 111. As illustrated in FIG. 9, the operation display section 11 displays the second list.

The changing section 16B adds the visually-identifiable information to each corresponding file name included in the second list. Specifically, the changing section 16B adds the check mark to each of "B-200", "B-101", and "B-202". More specifically, the changing section 16B adds the check mark to each of "B-200", "B-101", and "B-202" in response receiving respective operations by the second user PB.

For example, the check mark is added to each of "B-200", "B-101", and "B-202". On the other hand, the check mark is added to neither of "B-100", "B-201", "B-102", and "B-203".

The display controller 16A controls the image forming section 14 so that an image is formed based on the file indicated by the file name to which the check mark (mark information) is added. Specifically, the display controller 16A controls the image forming section 14 so that an image is formed in each of "B-200", "B-101", and "B-202". As a result, each user can easily form an image based on a desired file.

Figure 10:
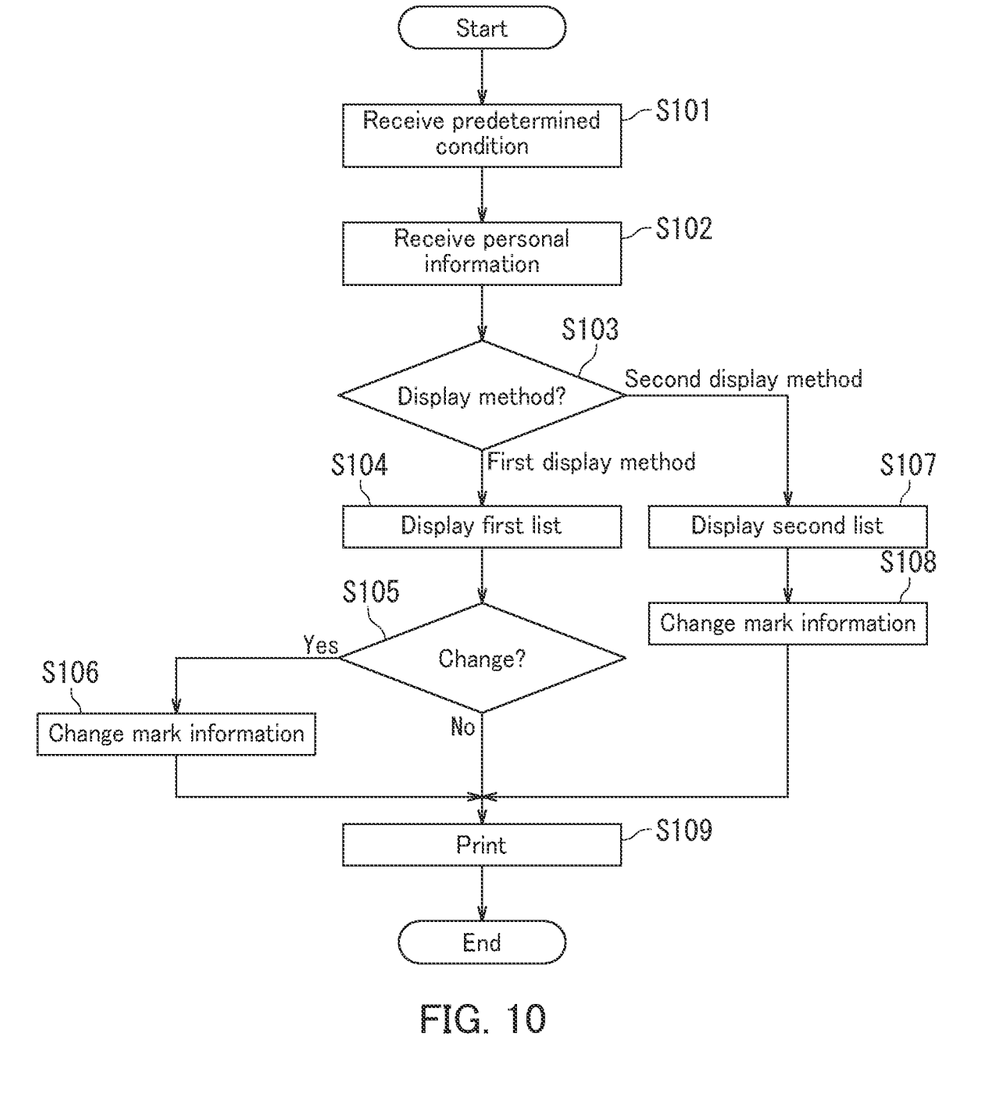
FIG. 10 is a flow chart illustrating a process by the image forming apparatus according to the first embodiment.

A process of the image forming apparatus 10 will be described with reference to FIG. 10. FIG. 10 is a flow chart illustrating the process of the image forming apparatus 10. As shown in FIG. 10, the operation display section 11 receives a predetermined condition in Step S101. The predetermined condition indicates that no image is formed through the image forming section 14, for example.

In Step S102, the operation display section 11 then receives a piece of personal information among the pieces of personal information. The piece of personal information specifies, for example the second user PB.

In Step S103, the operation display section 11 then determines whether either the first display method or the second display method has been received. If the first display method is received in Step S103, the process proceeds to Step S104. On the other hand, if the second display method is received in Step S103, the process proceeds to Step S107.

In Step S104, the operation display section 11 then displays the first list.

In Step S105, the changing section 16B then determines whether to receive adding or deleting the visually-identifiable information (e.g., check mark, mark information) to or from each file name included in the first list. If a positive determination (Yes) is made in Step S105, the process proceeds to Step S106. On the other hand, if a negative determination (No) is made in Step S105, the process proceeds to Step S109.

In Step S106, the changing section 16B then adds or deletes the visually-identifiable information (e.g., check mark, mark information) to or from each file name included in the first list.

On the other hand, the operation display unit 11 displays the second list in Step S107.

In Step S108, the changing section 16B adds the visually-identifiable information (e.g., check mark, mark information) to each corresponding file name included in the second list.

In Step S109, the display controller 16A controls the image forming section 14 so that an image is formed based on a file indicated by each file name to which the visually-identifiable information (e.g., check mark, mark information) is added.

Second Embodiment

Figure 11:
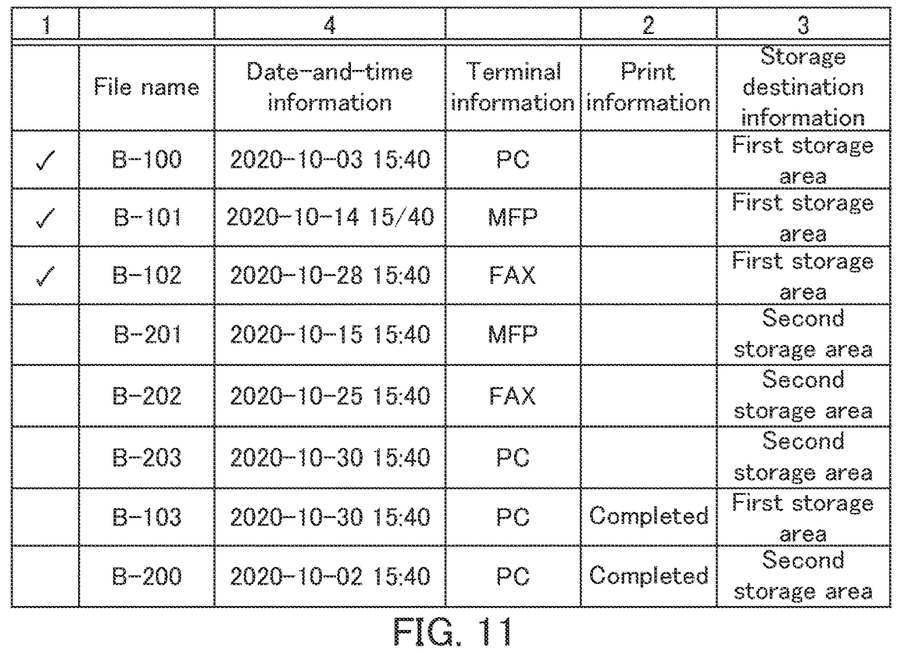
FIG. 11 is a diagram illustrating a first list which, in a second embodiment of the present invention, an image forming apparatus displays on a display section.

An image forming system 100 in a second embodiment of the present invention will be described with reference to FIG. 11. FIG. 11 is a diagram illustrating a first list which the image forming apparatus 10 displays on a display section 111. The image forming system 100 differs from that in the first embodiment in that a predetermined condition is stored in a predetermined storage area among a plurality of storage areas.

As illustrated in FIG. 11, a display controller 16A controls the display section 111 so that the display section 111 adds visually-identifiable information to file names, which satisfy the predetermined condition, among file names in the first list. The predetermined condition further includes being stored in a first storage area 18A.

Assume that "B-100", "B-101", and "B-102" are stored in the first storage area 18A, while no image is formed in "B-100", "B-101", and "B-102". In this case, a check mark is added to each of "B-100", "B-101", and "B-102". On the other hand, when respective corresponding images are formed in "B-200" and "B-103", the check mark is added to neither of "B-200" and "B-103". In addition, when "B-201", "B-202", and "B-203" are stored in a second storage area 18B, the check mark is added to neither of "B-201", "B-202", and "B-203".

The display controller 16A controls an image forming section 14 so that an image is formed based on the file indicated by a corresponding file name to which the check mark (mark information) is added. Specifically, the display controller 16A controls the image forming section 14 so that an image is formed in each of "B-100", "B-101", and "B-102". As a result, each user can easily form an image based on a desired file.

Third Embodiment

Figure 12:
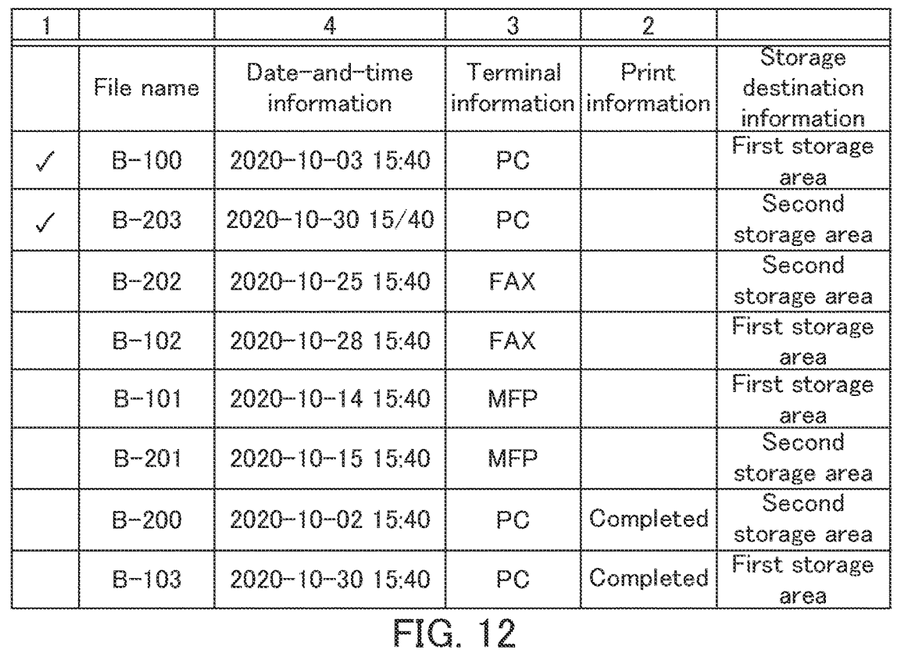
FIG. 12 is a diagram illustrating a first list which, in a third embodiment of the present invention, an image forming apparatus displays on a display section.

An image forming system 100 in a third embodiment of the present invention will be described with reference to FIG. 12. FIG. 12 illustrates a first list which an image forming apparatus 10 displays on a display section 111. The image forming system 100 differs from that in the first embodiment in that a predetermined condition further includes receiving a file from a device selected from terminal devices 30 and a FAX 40.

As illustrated in FIG. 12, a display controller 16A controls the display section 111 so that the display section 111 adds visually-identifiable information to each file name among a plurality of file names in the first list. Here, each file name described above satisfies a predetermined condition. The predetermined condition further includes the file having been received from a terminal device 30.

A check mark is added to each of "B-100" and "B-203" when a communication section 17 receives the file from the terminal device 30 with no image formed in "B-100" and "B-203". On the other hand, the check mark is added to neither of "B-200" and "B-103" when an image has been formed in each of "B-200" and "B-103". The check mark is added to neither of "B-202", "B-102", "B-101", and "B-201" when a file has been received in each of "B-202", "B-102", "B-101", and "B201" from a FAX or a reading section 15.

The display controller 16A controls an image forming section 14 so that an image is formed based on the file indicated by a corresponding file name to which visually-identifiable information is added. Specifically, the display controller 16A controls the image forming section 14 so that an image is formed in each of "B-100" and "B-203". As a result, each user can easily form an image based on a desired file.

Embodiments of the present invention are described above with reference to the accompanying drawings. However, the present invention is not limited to the above embodiments and may be implemented in various manners within a scope not departing from the gist thereof. The drawings mainly illustrate the constituent elements schematically to facilitate understanding thereof. Aspects such as thickness, length, and number of the constituent elements illustrated in the drawings may differ in practice for convenience of drawing preparation. Furthermore, aspects such as shape and dimension of the constituent elements illustrated in the above embodiments are examples and not particular limitations. The constituent elements may be variously altered within a scope not substantively departing from the effects of the present invention.

(1) Although the image forming apparatus 10 described with reference to FIGS. 1 to 12 is a color photocopier, the present invention is not limited to this. The image forming apparatus may be of any type as long as it forms an image on a sheet of paper 19. For example, the image forming apparatus may be a monochrome copying machine. The image forming apparatus may also be a multi-function printer.

(2) As described with reference to FIGS. 1 to 12, the visually-identifiable information is a check mark, but the present invention is not limited to this. The visually-identifiable information may be visually identifiable. Examples of the visually-identifiable information include an open circle image, a thick frame image, a red image, and a flashing image.

(3) As described with reference to FIGS. 1 to 12, in the third embodiment, the predetermined condition further includes a file having been received from a device selected from the terminal devices 30 and the FAX 40, but the present invention is not limited to this. The predetermined condition may include being created through the reading section 15. As a result, each user can easily form an image based on a desired file.

INDUSTRIAL APPLICABILITY

The present invention is applicable to image forming apparatuses.

The invention claimed is:

1. An image forming apparatus, comprising:
    storage that stores a plurality of files for each of, pieces of personal information, each of the plurality of files being associated with one piece of personal information among the pieces of personal information;
    a reception section that receives a piece of personal information among the pieces of personal information;
    a display section that displays a first list, the first list including a plurality of file names that respectively indicates the plurality of files, each of the plurality of files being associated with corresponding personal information which the reception section has received;
    an image forming section that forms an image based on the first list; and
    a display controller that controls the display section so that the display section adds visually-identifiable information to each file name, in which the image has not yet been formed with the image forming section, among the plurality of file names in the first list.

2. The image forming apparatus according to claim 1, wherein
    the display controller controls the image forming section so that the image forming section forms the image based on a file indicated by a file name to which the visually-identifiable information is added.

3. The image forming apparatus according to claim 1, wherein:
    the storage includes a plurality of storage areas;
    the plurality of files is stored in any of the plurality of storage areas; and
    the display controller controls the display section so that the display section adds the visually-identifiable information to a file name which is stored in a predetermined storage area among the plurality of storage areas.

4. The image forming apparatus according to claim 1, further comprising a receiving section that receives a file among the plurality of files from a personal computer or a facsimile machine, wherein:
    the storage stores the plurality of files each of which is associated with terminal information, the terminal information indicating either the personal computer or the facsimile machine; and
    the display controller controls the display section so that the display section adds the visually-identifiable information to the file name whose file has been received from a device selected from devices including the personal computer and the facsimile machine.

5. The image forming apparatus according to claim 1, further comprising a reading section that reads an image to create a corresponding file of the plurality of files, wherein:
    the storage stores the plurality of files, which is associated with information created through the reading section; and
    the display controller controls the display section so that the display section adds visually-identifiable information to a file name whose file has been created through the reading section.

6. The image forming apparatus according to claim 1, wherein:
- the storage stores the plurality of files, each of which is associated with date-and-time information indicating date and time when the storage has stored,
- the reception section receives one of display methods including a first display method and a second display method; and
- the display section displays the first list when the first display method has been received, and displays a second list when the second display method has been received, the second list including the plurality of file names arranged in order of date and time.

7. The image forming apparatus according to claim 6, further comprising a changing section that adds or deletes the visually-identifiable information to or from each of the plurality of file names included in the first list or the second list.

8. The image forming apparatus according to claim 1, wherein:
- the display controller controls the display section so that the display section adds print information to a file name, in which the image has been formed with the image forming section, among the plurality of file names in the first list,
- the print information is information indicating whether or not the image has been formed with the image forming section.

9. The image forming apparatus according to claim 1, wherein the visually-identifiable information is an image selected from images including a check mark, an open circle image, a thick frame image, a red image, and a flashing image.

* * * * *